US008380742B2

(12) United States Patent
Kiziltunc et al.

(10) Patent No.: US 8,380,742 B2
(45) Date of Patent: Feb. 19, 2013

(54) INTEGRATION OF DATABASE REPORTING WITH ERP SYSTEMS

(75) Inventors: Mehmet Kerem Kiziltunc, Istanbul (TR); Claus Busk Andersen, Lejre (DK); Lars-Bo Christiansen, Morud (DK); Julia Lisovaya, Kokkedal (DK)

(73) Assignee: Microsoft Corporation, Redmond, WA (US)

( * ) Notice: Subject to any disclaimer, the term of this patent is extended or adjusted under 35 U.S.C. 154(b) by 425 days.

(21) Appl. No.: 11/539,971

(22) Filed: Oct. 10, 2006

(65) Prior Publication Data
US 2008/0086495 A1    Apr. 10, 2008

(51) Int. Cl.
*G06F 17/30* (2006.01)
(52) U.S. Cl. ...................................... 707/779; 707/803
(58) Field of Classification Search ........................ None
See application file for complete search history.

(56) References Cited

U.S. PATENT DOCUMENTS

| 5,404,295 | A | 4/1995 | Katz et al. |
| 5,546,455 | A | 8/1996 | Joyce et al. |
| 5,630,122 | A | 5/1997 | Kaplan et al. |
| 5,692,181 | A | 11/1997 | Anand et al. |
| 5,721,903 | A | 2/1998 | Anand et al. |
| 6,160,549 | A | 12/2000 | Touma et al. |
| 6,233,583 | B1 | 5/2001 | Hoth |
| 7,031,979 | B2 | 4/2006 | Kauffman |
| 7,051,038 | B1 | 5/2006 | Yeh et al. |
| 7,076,492 | B2 | 7/2006 | Campbell |
| 7,640,496 | B1 * | 12/2009 | Chaulk et al. ................ 715/243 |
| 2002/0013786 | A1 | 1/2002 | Machalek |
| 2003/0055843 | A1 | 3/2003 | Chiu |
| 2003/0195863 | A1 * | 10/2003 | Marsh .............................. 707/1 |
| 2004/0078355 | A1 * | 4/2004 | Suresh ............................ 707/1 |
| 2004/0117358 | A1 * | 6/2004 | von Kaenel et al. ............ 707/3 |
| 2004/0148195 | A1 | 7/2004 | Kalies |
| 2004/0172617 | A1 * | 9/2004 | Ramani et al. ............... 717/114 |
| 2005/0267889 | A1 * | 12/2005 | Snyder et al. ................. 707/10 |
| 2005/0289524 | A1 * | 12/2005 | McGinnes .................... 717/140 |
| 2006/0026498 | A1 * | 2/2006 | Hays et al. .................... 715/503 |

OTHER PUBLICATIONS

International Search Report dated Jan. 21, 2008 in International Application PCT/US2007/077272.
"Microsoft releases Microsoft Dynamics GP Extensions to Empower Users," Jun. 2006, TrinSoft Ledger, vol. 4, Issue 2, 4 pages.
"Progent's Computer Consulting and Support Services at a Glance," downloaded Aug. 8, 2006 from http://www.progent com/computer_consulting_experts_berkeley.htm, 6 pages.
"Sikich ICS Technology Division Sponsored User's Group for Microsoft Dynamics," downloaded Aug. 8, 2006 from http://www.icsadvantage.com/web/ICS+Advantage/Microsoft+Dynamics/Sikich  +ICS+Technology+Division+Sponsored+Users+Group+for+Microsoft+Dynamics.htm, 7 pages.

* cited by examiner

*Primary Examiner* — Vei-Chung Liang
*Assistant Examiner* — Fatima Mina
(74) *Attorney, Agent, or Firm* — Hope Baldauff Hartman, LLC

(57) ABSTRACT

Increased reporting capabilities from a database system may be available in a customer relationship system while functionality of the customer relationship management system is maintained.

11 Claims, 4 Drawing Sheets

INTEGRATION OF DATABASE REPORTING WITH ERP SYSTEMS

BACKGROUND

Enterprise resource planning ("ERP") systems have made tracking resources and planning resource use easier. These interactive systems provide immediate information about resources which may be used to better service customers. In addition, the ERP system may store data in a different manner than many systems, such as storing actual total amounts rather than storing formulas to calculate total amounts. ERP systems have report generating abilities that make it easy to visualize the data in the ERP system.

Database systems have been around even longer than ERP systems. Database systems store large amounts of data in a way that is easy to search and manipulate. Data is usually stored as individual entries and totals usually do not have their own entry but are calculated as needed by adding up the individual elements from the database. As database systems have been around for a significant period of time, the ability to create reports is refined.

SUMMARY

A enterprise resource planning system may be used in conjunction with a database system to create reports. A report object may be used that contains layout information, a report subclass and metadata. The metadata may be used to determine what data should be accessed from a database, how it should be formatted and how it should be displayed. As a result, increased report capabilities from the database system may be available in the enterprise resource planning system while functionality of the enterprise resource planning system is maintained.

FIGURES

DESCRIPTION

Figure 1:
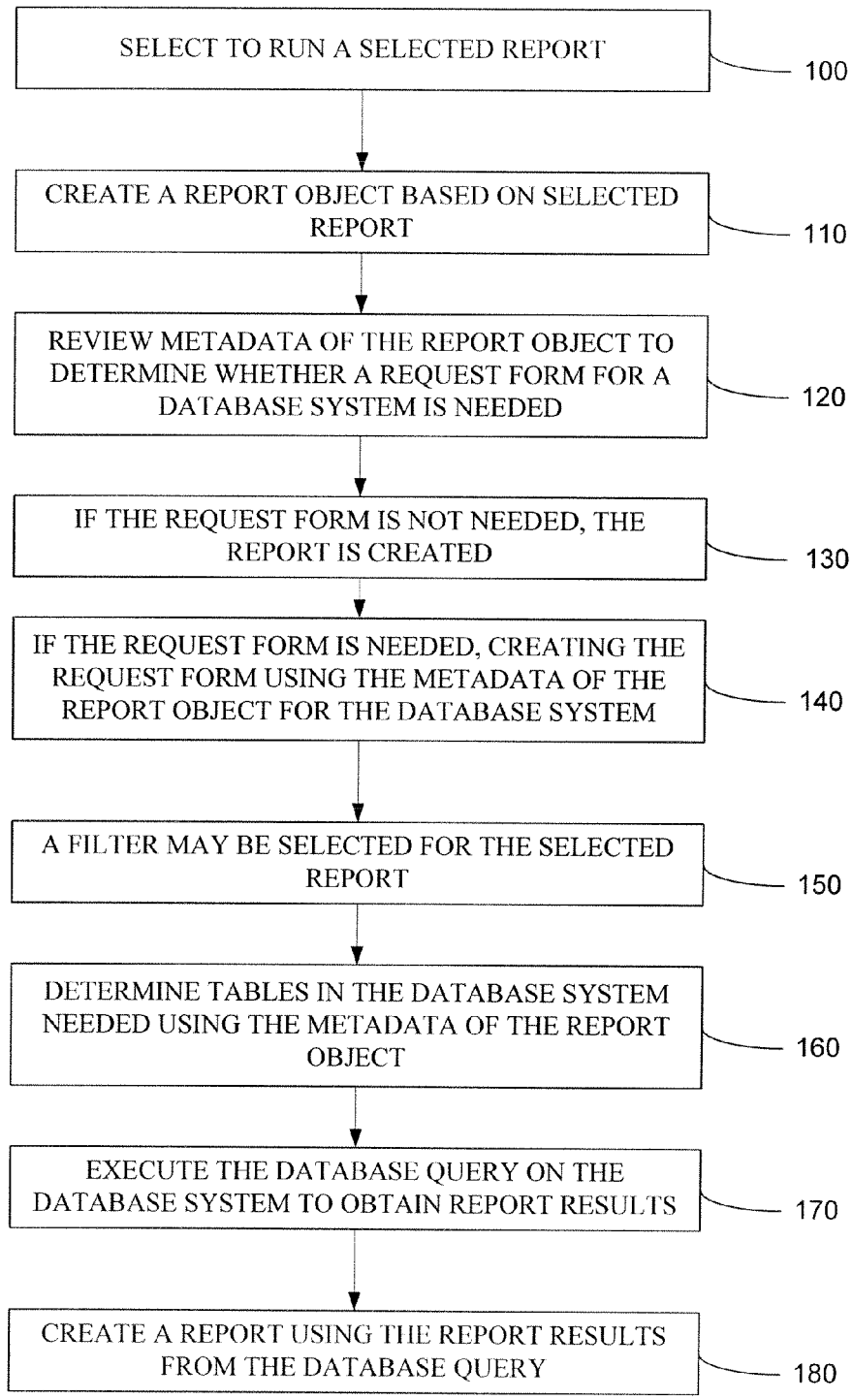
FIG. 1 illustrates a method of using a ERP system to access the report capabilities of a database system.

An enterprise resource planning system ("ERP") may be able to create some reports, but additional report creating abilities may be created by allowing the ERP system to use report functions from a database system. One method to allow a ERP system to access a database system is described herein. A sample ERP system may be Dynamics Nav by Microsoft Corporation and a sample database program may be SQL Reporting Services by Microsoft Corporation, but the principles of the method and apparatus may be application to virtually any ERP system and any database system. FIG. 1 may illustrate a method of using a ERP system to access the report capabilities of a database system.

Referring to FIG. 1, at block 100, the method may select to run a selected report. A user or other program may define desired data items for a report. Data items may be a table with a key, sort order, filter criteria and a join/link condition with another data item such that multiple tables may be used in a report. The user may then pick the fields from the data item that he wants to see on the report. Next, the layout of the report may be selected. A layout designer may be to select that layout of the fields from the data items selected. The report may be designed using an addition program module, such as Visual Studio by Microsoft Corporation. The user may then save the report and continue with other tasks like defining a request form, and calling the report from a menu item or from other code.

At block 110, the method may create a report object based on selected report. Creating a report may include creating a layout description file using a layout generator, creating a subclass that contains report specific variables and triggers using a code generator and creating a report metadata file using a metadata generator.

Figure 2:
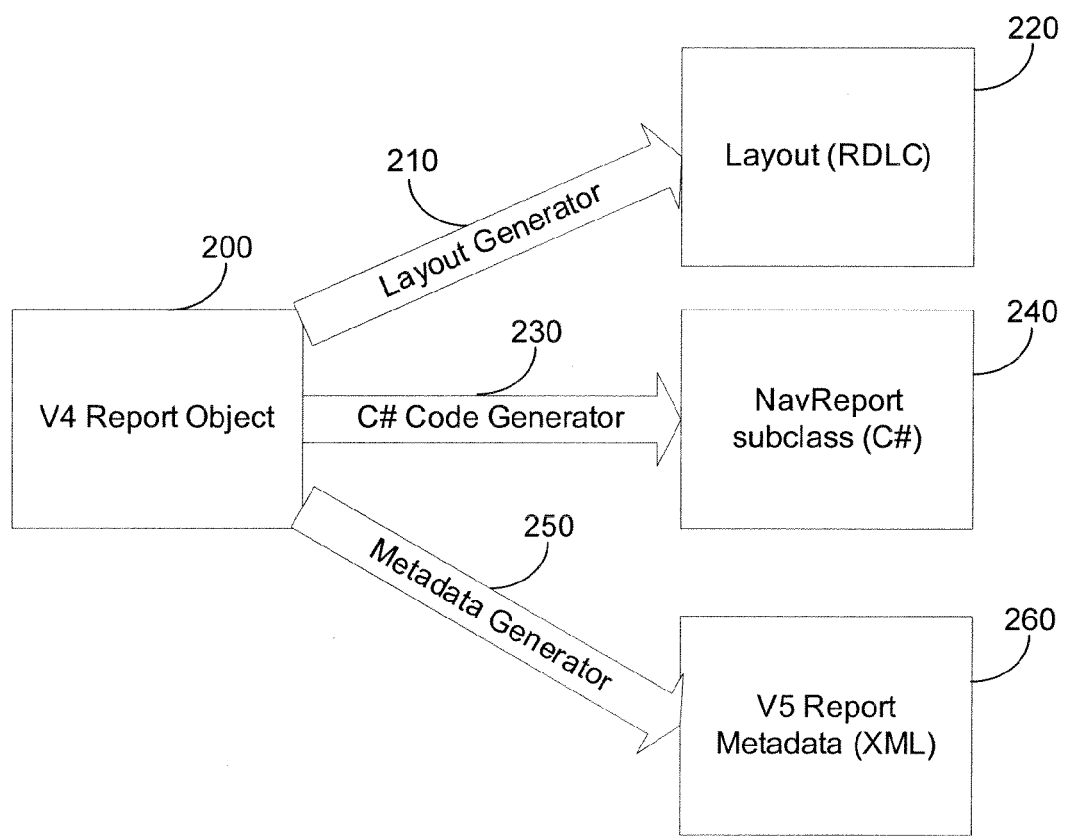
FIG. 2 is an illustration of one embodiment of the report object.

FIG. 2 may be an illustration of one manner in which the report object 200 is created. A layout generator 210 may be used to create the layout which is report definition language client ("RDLC") file 220 or any other layout file.

Also, a code generator 230 such as a C# Code Generator may be used to create a subclass for the report, such as a NavReport subclass 240. For each report, code for a subclass may be auto-generated. The code may be in a language such as C#. The code generation may basically follow the auto-code generation rules of other objects like tables, forms, and XML ports, etc. The subclass may contain report specific variables and implementations of the report and data item triggers.

Sample C# code may be as follows:

```
public class Report3 : NavReport
{
    private Table45 GLRegister;
    private Table17 GLEntry;
    private Table15 GLAcc;
    private NavText GLRegFilter;
    private void InitializeComponent( )
    {
    }
    protected override void OnInitReport( )
    {
        GLRegFilter = GLRegister.GetFilters( );
    }
}
```

The report object 200 also may use a metadata generator 250 to create a metadata report 260. The metadata report 260 may be in XML, for example, or in any other suitable language. The metadata file may simply be an XML document that describes the basics of a report. It may contain:

The report name, captions, permissions, transaction mode, etc.

The data items used in the report, with table views and links between tems; and

The fields of each data item.

A sample metadata file may be as follows:

```
<?xml version="1.0" encoding="utf-8" ?>
<Report>
  <Id>108</Id>
  <Name>Customer - Order Detail</Name>
  <DataItems>
    <DataItem>
      <DataItemIndent>0</DataItemIndent>
      <DataItemTable>Customer</DataItemTable>
      <DataItemVariableName></DataItemVariableName>
      <Fields>
        <FieldName>No.</FieldName>
        <FieldType>Code</FieldType>
```

```
    </Fields>
    <ReqFilterFields>No.,Search Name,Priority</ReqFilterFields>
    <PrintOnlyIfDetail>Yes</PrintOnlyIfDetail>
</DataItem>
```

Report metadata can be seen as an XML version of the report properties. This dataset and layout are then presented to SQL Reporting Services for rendering this report for preview or printing purposes.

The reporting runtime may be a .NET implementation that is basically built around an object such as NavReport, and its subtypes. This runtime may be responsible for the following:

Integrating with the rest of the runtime environment;
Based on data items, accessing data, sorting, filtering records to be accessed;
Executing application code (which may be transformed from application language into C#);
Implementing specific application security and indirect security concepts from the ERP system;
Supporting transaction model in the report properties; and
Binding report parameters and request forms together.

At block 120, the method may review metadata of the report object to determine whether a request form for a database system is needed. If the report needs to display a request form, the report metadata may note this. If a request form is needed, an event may be raised which may be caught. Then, communication may begin to start a communication with the client to display the request form. At this point, the report object may be instantiated. The method is designed such that the code-behind functionality between the request form and the report object instance may be supported, so when the user makes changes on a request form, the report variables get updated properly.

A sample schema for the metadata may be as follows:

```
<?xml version="1.0" encoding="utf-8"?>
<xs:schema
targetNamespace="http://www.microsoft.com/Dynamics/Nav/Metadata/Report.xsd"
elementFormDefault="qualified"
xmlns="http://www.microsoft.com/Dynamics/Nav/Metadata/Report.xsd"
xmlns:mstns="http://www.microsoft.com/Dynamics/Nav/Metadata/Report.xsd"
xmlns:xs="http://www.w3.org/2001/XMLSchema">
        <xs:element name="Report">
          <xs:complexType>
            <xs:sequence>
              <xs:element name="Id" type="xs:string" minOccurs="1" maxOccurs="1"/>
              <xs:element name="Name" type="xs:string" minOccurs="1" maxOccurs="1"/>
              <xs:element name="Caption" type="xs:string" minOccurs="1" maxOccurs="1"/>
              <xs:element name="CaptionML" type="xs:string" minOccurs="1" maxOccurs="1"/>
              <xs:element name="ShowPrintStatus" type="xs:boolean" minOccurs="1" maxOccurs="1"/>
              <xs:element name="UseRequestForm" type="xs:boolean" minOccurs="1" maxOccurs="1"/>
              <xs:element name="ProcessingOnly" type="xs:boolean" minOccurs="1" maxOccurs="1"/>
              <xs:element name="UseSystemPrinter" type="xs:boolean" minOccurs="1" maxOccurs="1"/>
              21 xs:element name="TransactionType" minOccurs="1" maxOccurs="1">
                <xs:simpleType>
                  <xs:restriction base="xs:string">
                    <xs:enumeration value="UpdateNoLocks" />
                    <xs:enumeration value="Update" />
                    <xs:enumeration value="Snapshot" />
                    <xs:enumeration value="Browse" />
                    <xs:enumeration value="Report" />
                  </xs:restriction>
                </xs:simpleType>
              </xs:element>
              <xs:element name="Description" type="xs:string" minOccurs="1" maxOccurs="1"/>
              <xs:element name="Permissions" type="xs:string" minOccurs="1" maxOccurs="1"/>
              <xs:sequence>
                <xs:element ref="DataItem" minOccurs="1" maxOccurs="unbounded"/>
              </xs:sequence>
            </xs:sequence>
          </xs:complexType>
        </xs:element>
        <xs:element name="DataItem">
          <xs:complexType>
            <xs:sequence>
              <xs:element name ="DataItemIndent" type ="xs:integer" minOccurs="1" maxOccurs="1"/>
              <xs:element name ="DataItemTable" type ="xs:integer" minOccurs="1" maxOccurs="1"/>
              <xs:element name ="DataItemTableView" type ="xs:string"
```

-continued

```
                minOccurs="1" maxOccurs="1"/>
                <xs:element name ="DataItemLinkReference" type ="xs:integer"
minOccurs="1" maxOccurs="1"/>
                <xs:element name ="DataItemLink" type ="xs:integer"
minOccurs="1" maxOccurs="1"/>
                <xs:element name ="RequestFilterHeading" type ="xs:string"
minOccurs="1" maxOccurs="1"/>
                <xs:element name ="RequestFilterHeadingML" type
="xs:string" minOccurs="1" maxOccurs="1"/>
                <xs:element name ="RequestFilterFields" type ="xs:string"
minOccurs="1" maxOccurs="1"/>
                <xs:element name ="MaxIteration" type ="xs:integer"
minOccurs="1" maxOccurs="1"/>
                <xs:element name ="DataItemVariableName" type ="xs:string"
minOccurs="1" maxOccurs="1"/>
                <xs:element name ="PrintOnlyIfDetail" type ="xs:boolean"
minOccurs="1" maxOccurs="1"/>
                <xs:element ref="DataItemField" minOccurs="1"
maxOccurs="unbounded"/>
            </xs:sequence>
        </xs:complexType>
    </xs:element>
    <xs:element name="DataItemField">
        <xs:complexType>
            <xs:sequence>
                <xs:element name ="Name" type ="xs:string" minOccurs="1"
maxOccurs="1"/>
                <xs:element name ="DataType" type="xs:boolean"
minOccurs="1" maxOccurs="1"/>
                <xs:element name ="SourceExpression" type ="xs:string"
minOccurs="1" maxOccurs="1"/>
                <xs:element name ="AutoCalcField" type="xs:boolean"
minOccurs="1" maxOccurs="1"/>
            </xs:sequence>
        </xs:complexType>
```

At block 130, if the request form is not needed, the report is created as usual.

At block 140, if the request form is needed, the request form is created using the metadata of the report object for the database system. At the time of compilation or during import, two artifacts may be generated: Report metadata, which is an XML document that may be saved into an object metadata table as with any other metadata document, and a NavReport subclass, specific to the report being compiled. If the report has a request form, those also may be transformed into the corresponding artifacts as well.

Report metadata can be seen as an XML version of the report properties. It contains enough information for the reporting runtime to generate a report dataset if the report does not contain any code. In other words, reporting runtime should be able to take a Report Metadata and a NavReport subclass that has no event handlers or local variables of its own, and then generate a report dataset.

At block 150, a filter may be selected for the selected report. The filter may be based on data items and may be used to filter query results. Filters are well known and any logical filter may be used.

At block 160, the method may determine tables in the database system needed using the metadata of the report object. The metadata may contain virtually any information. Depending on the database used, the metadata may vary. Sample metadata has been disclosed previously.

At block 170, the method may execute the database query on the database system to obtain report results. Database queries are well known. In short, criteria are used to obtain the desired data out of a large quantity of data in the database.

At block 180, the method may create a report using the report results from the database query. By using the ERP system, advanced report features may be available such as increased colors, option to create reports in PDF, etc.

Figure 3:
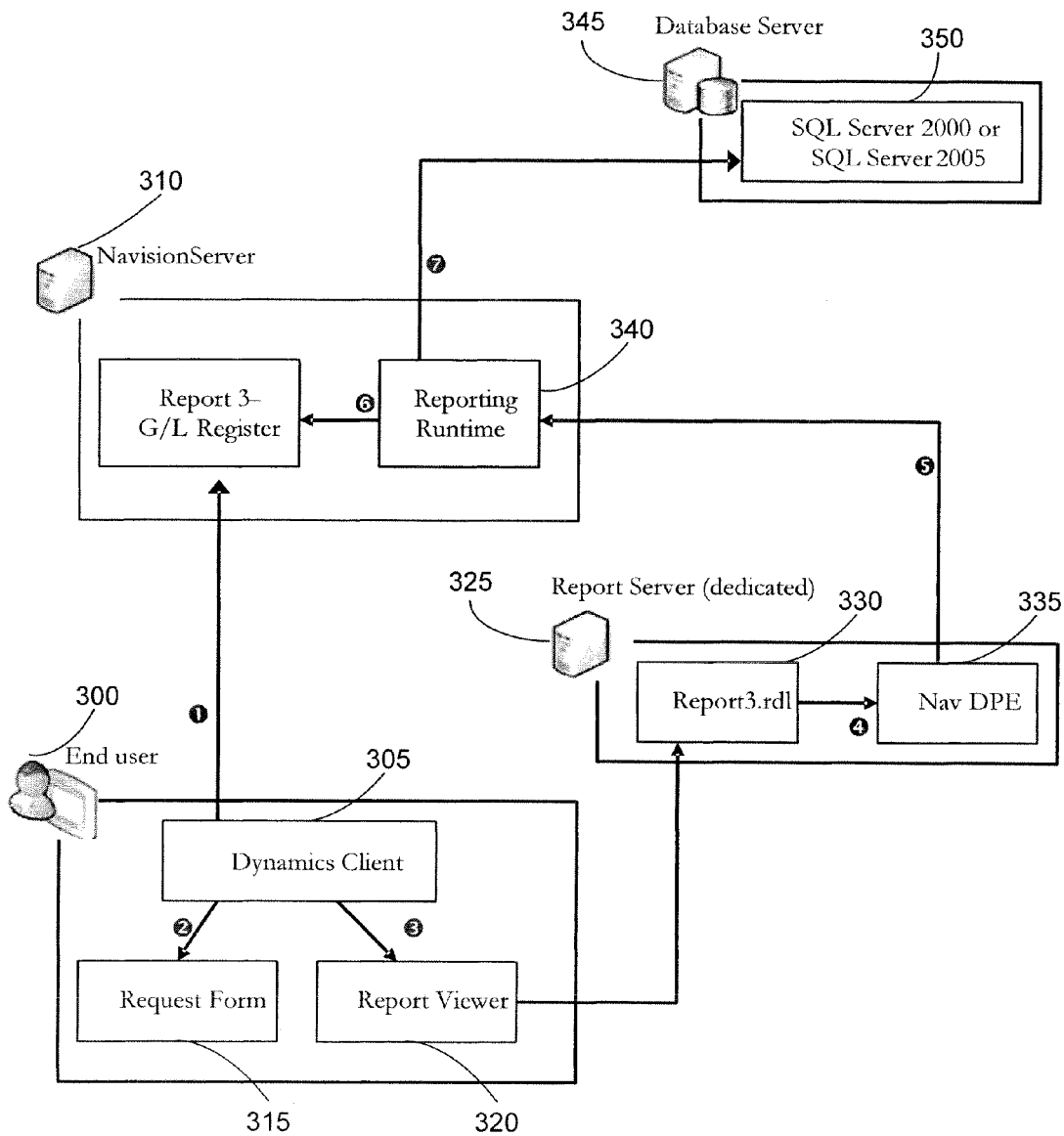
FIG. 3 is a high level review of the creation of a report.

FIG. 3 may be a high level review of the creation of a report. An end user 300 may select a menu item in a ERP system 305 such as Navision to run a report. The ERP system 305 may make a call to a ERP server such as the Navision Service Tier 310 to initialize a NavReport object and check its metadata to see if it requires a request form. If the report requires a request form 315, the ERP system 305 may build a request form based on the parameters on the report metadata, typically using request form 315 specific parameters on the data items. The user may enter a filter. The ERP client may communicate the changes back to the ERP server 310. The user may select on Preview such as a report viewer 320. The request may be communicated to a report server 325. The ERP system 305 may initiate the execution of the report query through a reporting runtime by communicating a file such as a data processing extension file 335 to the report runtime 340. Reporting runtime 340 may use the report metadata for detecting which tables in the database 345 to use, the report object to get the parameters set and to execute the code on triggers and retrieves data from SQL 350. The user may retrieve the resulting data (DataSet) and the format file (RDLC) from the ERP service tier 310 and passes them to the Report Viewer 320, which renders and displays the report.

Figure 4:
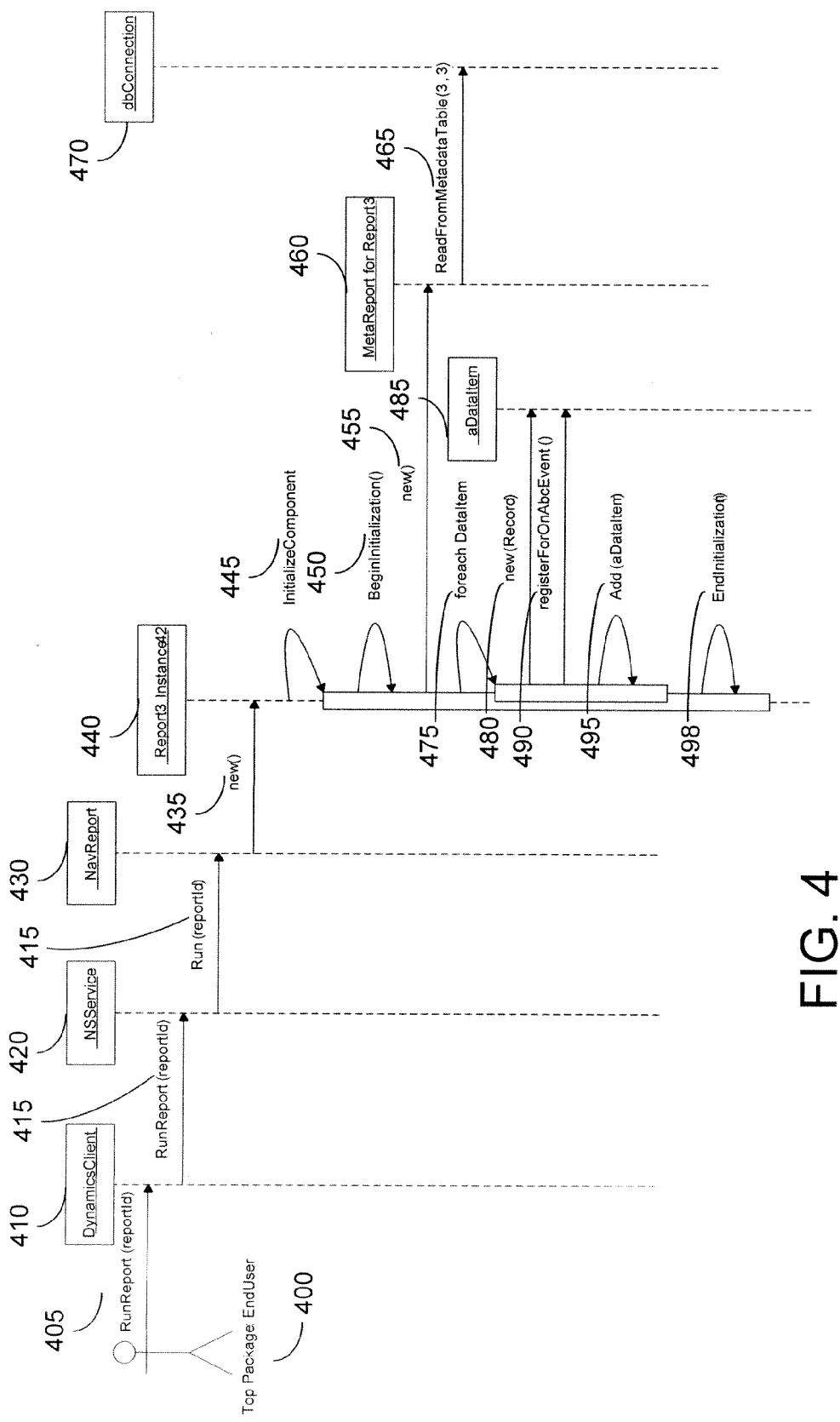
FIG. 4 is a specific illustration of the construction of a report.

FIG. 4 may be a specific illustration of the construction of a report. In this example, Dynamics Nav is the ERP system used. At block 400, an end user may select to run a report 405 using the Dynamics client 410. A run report application may begin 415. In FIG. 5, the application may be RunReport (reportID). The application may call to a server to complete the request 420. In the example in FIG. 5, the method may call to a Navision server service 420. The Navision server service 420 may call a report run function 425 such as Run(reportID). This request may be forwarded to a specific report running function 425 such as NavReport 430. The report running function 425 may call for a new report 435 using the specific request data 440, such as Report 3, Instance42 in FIG. 4. The report 435 may initialize 445 the needed components and the BeginInitialization function 450 may begin. A request for a new data item may be made 455. Metadata for the requested report 460 may be stored in a table and the metadata may be used to determine the data to be retrieved 465 from the database 470.

For each data item 475 retrieved from the database 470, a new record 480 may be created and the data item 485 may be registered for an event 490. The data item 485 may then be added to the report 495. At block 497, the initialization may end and the report 435 may be ready.

The following may be psuedocode implementing the above example.

```
public class Report3 : NavReport
{
    public Report3( )
        : base(3)
    {
        InitializeComponent( );
    }
    public Report3(NavConnection connection)
        : base(connection, 3)
    {
        InitializeComponent( );
    }
    private void InitializeComponent( )
    {
        BeginInitialization( );
        glEntry = new Table17( );
        glRegister = new Table45( );
        glAcc = new Table15( );
        glRegFilter = new NavText( );
        /* Instantiate DataItems and register their event handlers. */
        glEntryDataItem = new NavDataItem(glEntry);
        Add(glEntryDataItem);
        glEntryDataItem.OnAfterGetRecord =
glEntryDataItem__OnAfterGetRecord;
        glEntryDataItem.OnPreDataItem =
        glEntryDataItem__OnPreDataItem;
        glRegisterDataItem = new NavDataItem(glRegister);
        Add(glRegisterDataItem);
        EndInitialization( );
    }
    void glEntryDataItem__OnPreDataItem( )
    {
        glEntry.SetRange("Entry No.", glRegister.FromEntryNo,
glRegister.ToEntryNo);
    }
    void glEntryDataItem__OnAfterGetRecord( )
    {
        if (!glAcc.Get(DataError.ThrowError, "G/L Account No."))
        {
            glAcc.Init( );
        }
    }
    protected override void OnInitReport( )
    {
        glRegFilter = glRegister.GetFilters( );
    }
        private Table17 glEntry;
        private Table45 glRegister;
        private NavDataItem glEntryDataItem;
        private NavDataItem glRegisterDataItem;
        private Table15 glAcc;
        private NavText glRegFilter;
}
```

Other advantages to the method may be available. By keeping the ERP system functional and not just running reports from the SQL system, items that are part of the ERP system may be available as part of the report. For example, ERP systems often have "flowfields" or fields that are actually summations of a plurality of other fields. In a traditional SQL reporting system, each of the individual fields may have to be selected and added before being added to a report. Using the flowfield concept from ERP, only one entry needs to be selected.

In addition, by keeping the ERP system as the interface into the database system, an extra layer of protection is added to the database system. As the data in the database is likely to be sensitive and unauthorized editing of the data could be devastating, allowing access to the database only through the ERP system may keep users further removed from the underlying data.

Additionally, ERP systems allow users to design a single report to work with multiple companies. For example, when a user designs a report, it may be designed generically against a table, and it may be run against any company. By accessing a plurality of different databases such as databases specific to each company, the generic report will be company specific.

Another novel aspect is that it is possible to execute additional business logic by calling other application objects like tables, or codeunits to make calculations while generating the report. For example, a tax amount may be calculated on the fly and this tax amount would not be stored in a database alone. As the business logic resides in the service tier and not in the database, a database reporting system may be unable to access a calculated tax amount (assuming it is not stored in the database as a separate entry).

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of implementing a customer relationship management system that accesses a database system to create a report, the method comprising:

selecting, from a plurality of reports associated with the customer relationship management system, a report to run;

using a layout generator to generate a Report Definition Language Client ("RDLC") file defining a layout for the selected report;

using a code generator to generate a C# subclass containing report specific variables and triggers for the selected report;

using a metadata generator to generate an XML metadata file describing basics of the selected report;

reviewing the XML metadata file to determine whether a request form for a database system is needed, the XML metadata file specifying at least the data to retrieve and the request form allowing a filter to be selected;

if the request form is not needed, running the selected report;

if the request form is needed, creating the request form for the database system using the XML metadata file;

selecting a filter for the selected report;
determining, using the XML metadata file, tables in the database system needed to run the report;
creating a database query;
executing the database query on the database system to obtain report results; and
using the RDLC file to create the selected report from the report results from the database query,
wherein a reporting runtime built around the generated C# subclass binds together the report specific variables and the request form, such that when any change is made to the request form, the report specific variables are correspondingly updated.

2. The method of claim 1, wherein the XML metadata file contains at least one selected from a group comprising:
a report name;
a report caption;
a report permission;
a transaction mode;
a data items used in the report; and
fields of each data item.

3. The method of claim 2, wherein the data items used in the report include table views and links between the data items.

4. The method of claim 1, wherein data is accessed from the database using the request form.

5. The method of claim 1, further comprising using a reporting runtime program that utilizes the XML metadata file and the C# subclass to generate a report dataset.

6. A computer readable storage memory comprising computer executable code for creating reports in a customer relationship management system using a database system wherein the computer executable code comprises code for:
selecting, from a plurality of reports associated with the customer relationship managements system, a report to run;
using a layout generator to generate a Report Definition Language Client ("RDLC") file defining a layout for the selected report;
using a code generator to generate a C# subclass containing report specific variables and triggers for the selected report;
using a metadata generator to generate an XML metadata file describing basics of the selected report;
reviewing the XML metadata file to determine whether a request form for a database system is needed, the XML metadata file specifying at least the data to retrieve and the request form allowing a filter to be selected;
if the request form is not needed, running the selected report;
if the request form is needed, creating the request form for the database system using the XML metadata file;
selecting a filter for the selected report;
determining, using the XML metadata file, tables in the database system needed to run the report;
creating a database query;
executing the database query on the database system to obtain report results; and
using the RDLC file to create the selected report from the report results from the database query,
wherein a reporting runtime built around the generated C# subclass binds together the report specific variables and the request form, such that when any change is made to the request form, the report specific variables are correspondingly updated.

7. The computer readable storage memory of claim 6, wherein the XML metadata file contains at least one selected from a group comprising: a report name; a report caption; a report permission; a transaction mode; a data items used in the report; and fields of each data item.

8. The computer readable storage memory of claim 7, wherein the data items used in the report include table views and links between the data items.

9. The computer readable storage memory of claim 6, further comprising using a reporting runtime program that utilizes the XML metadata file and the C# subclass to generate a report dataset.

10. A computer system comprising a processor for executing computer executable code, a memory for storing computer executable code and an input output circuit for communicating computer executable code, the computer executable code comprising code for:
selecting, from a plurality of reports associated with an enterprise resource planning system, a report to run;
using a layout generator to generate a Report Definition Language Client ("RDLC") file defining a layout for the selected report;
using a code generator to generate a C# subclass containing report specific variables and triggers for the selected report;
using a metadata generator to generate an XML metadata file describing basics of the selected report;
reviewing the XML metadata file to determine whether a request form for a database system is needed, the XML metadata file specifying at least the data to retrieve and the request form allowing a filter to be selected;
if the request form is not needed, running the selected report;
if the request form is needed, creating the request form for the database system using the XML metadata file;
selecting a filter for the selected report;
determining, using the XML metadata file, tables in the database system needed to run the report;
creating a database query;
using a reporting runtime program to generate a result dataset from the database query on the database system utilizing the XML metadata file and the C# subclass; and
using the RDLC file to create the selected report from the result dataset,
wherein a reporting runtime built around the generated C# subclass binds together the report specific variables and the request form, such that when any change is made to the request form, the report specific variables are correspondingly updated.

11. The computer executable code of claim 10, wherein the XML metadata file contains at least one selected from a group comprising:
a report name;
a report caption;
a report permission;
a transaction mode;
a data items used in the report; and
fields of each data item.

* * * * *